(12) United States Patent
Hughes et al.

(10) Patent No.: US 9,665,368 B2
(45) Date of Patent: May 30, 2017

(54) SYSTEMS, APPARATUSES, AND METHODS FOR PERFORMING CONFLICT DETECTION AND BROADCASTING CONTENTS OF A REGISTER TO DATA ELEMENT POSITIONS OF ANOTHER REGISTER

(71) Applicant: Intel Corporation, Santa Clara, CA (US)

(72) Inventors: Christopher J. Hughes, Santa Clara, CA (US); Mark J. Charney, Lexington, MA (US); Jesus Corbal, Barcelona (ES); Milind B. Girkar, Sunnyvale, CA (US); Elmoustapha Ould-Ahmed_Vall, Chandler, AZ (US); Bret L. Toll, Hillsboro, OR (US); Robert Valentine, Kiryat Tivon (IL)

(73) Assignee: Intel Corporation, Santa Clara, CA (US)

(*) Notice: Subject to any disclaimer, the term of this patent is extended or adjusted under 35 U.S.C. 154(b) by 976 days.

(21) Appl. No.: 13/631,666

(22) Filed: Sep. 28, 2012

(65) Prior Publication Data
US 2014/0095843 A1    Apr. 3, 2014

(51) Int. Cl.
*G06F 9/30* (2006.01)

(52) U.S. Cl.
CPC ........ *G06F 9/3001* (2013.01); *G06F 9/30018* (2013.01); *G06F 9/30021* (2013.01); *G06F 9/30036* (2013.01); *G06F 9/30043* (2013.01)

(58) Field of Classification Search
CPC .................................................. G06F 9/30036
See application file for complete search history.

(56) References Cited

U.S. PATENT DOCUMENTS

| | | | |
|---|---|---|---|
| 7,196,708 B2 | 3/2007 | Dorojevets et al. | |
| 7,600,104 B2 | 10/2009 | Neumann | |
| 8,019,977 B2 | 9/2011 | Gonion et al. | |
| 2002/0007449 A1* | 1/2002 | Koyanagi | G06F 9/30036 712/4 |
| 2012/0159130 A1 | 6/2012 | Smelyanskiy et al. | |
| 2012/0166761 A1* | 6/2012 | Hughes | G06F 9/30018 712/7 |
| 2013/0246737 A1* | 9/2013 | Eichenberger | G06F 9/30021 712/201 |
| 2013/0339678 A1* | 12/2013 | Plotnikov | G06F 9/3001 712/222 |

(Continued)

OTHER PUBLICATIONS

PCT/US2013/045996 Notification of Transmittal of the International Search Report and the Written Opinion of the International Searching Authority, mailed Sep. 27, 2013, 6 pages.

(Continued)

*Primary Examiner* — Jacob A Petranek
(74) *Attorney, Agent, or Firm* — Nicholson De Vos Webster & Elliott, LLP

(57) ABSTRACT

Systems, apparatuses, and methods of performing in a computer processor broadcasting data in response to a single vector packed broadcasting instruction that includes a source writemask register operand, a destination vector register operand, and an opcode. In some embodiments, the data of the source writemask register is zero extended prior to broadcasting.

21 Claims, 18 Drawing Sheets

(56) References Cited

U.S. PATENT DOCUMENTS

| | | | |
|---|---|---|---|
| 2014/0089634 A1* | 3/2014 | Lee ..................... | G06F 9/30018 712/5 |
| 2014/0181466 A1* | 6/2014 | Forsyth ............... | G06F 9/30021 712/7 |
| 2014/0223139 A1* | 8/2014 | Lee ..................... | G06F 9/30021 712/5 |

OTHER PUBLICATIONS

PCT/US2013/045996 Notification Concerning Transmittal of Copy of International Preliminary Report on Patentability, mailed Apr. 9, 2015, 9 pages.
Kumar, Sanjeev, et al., "Atomic Vector Operations on Chip Multiprocessors," Proceedings of the 35th Annual International Symposium on Computer Architecture, pp. 441-452, Jun. 2008.

* cited by examiner

NUMBER OF ONE BIT VECTOR WRITE MASK ELEMENTS

| DATA ELEMENT SIZE FOR VECTOR | VECTOR SIZE | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS/SP | 4 | 8 | 16 |
| 64-BIT QWORDS/DP | 2 | 4 | 8 |

USE LOWER 16 BITS FOR 512 BIT VECTOR WITH 32 BIT DATA ELEMENTS

```
63        31       15                7               0
 1  ...  1  ...  0 0 1 1 1 0 0 0 0 1 1 0 1 0 1 1   Kx
```

USE LOWER 8 BITS FOR 512 BIT VECTOR WITH 64 BIT DATA ELEMENTS

USE LOWER 32 BITS FOR 512 BIT VECTOR WITH 16 BIT DATA ELEMENTS

USE ALL 64 BITS FOR 512 BIT VECTOR WITH 8 BIT DATA ELEMENTS

Figure 8

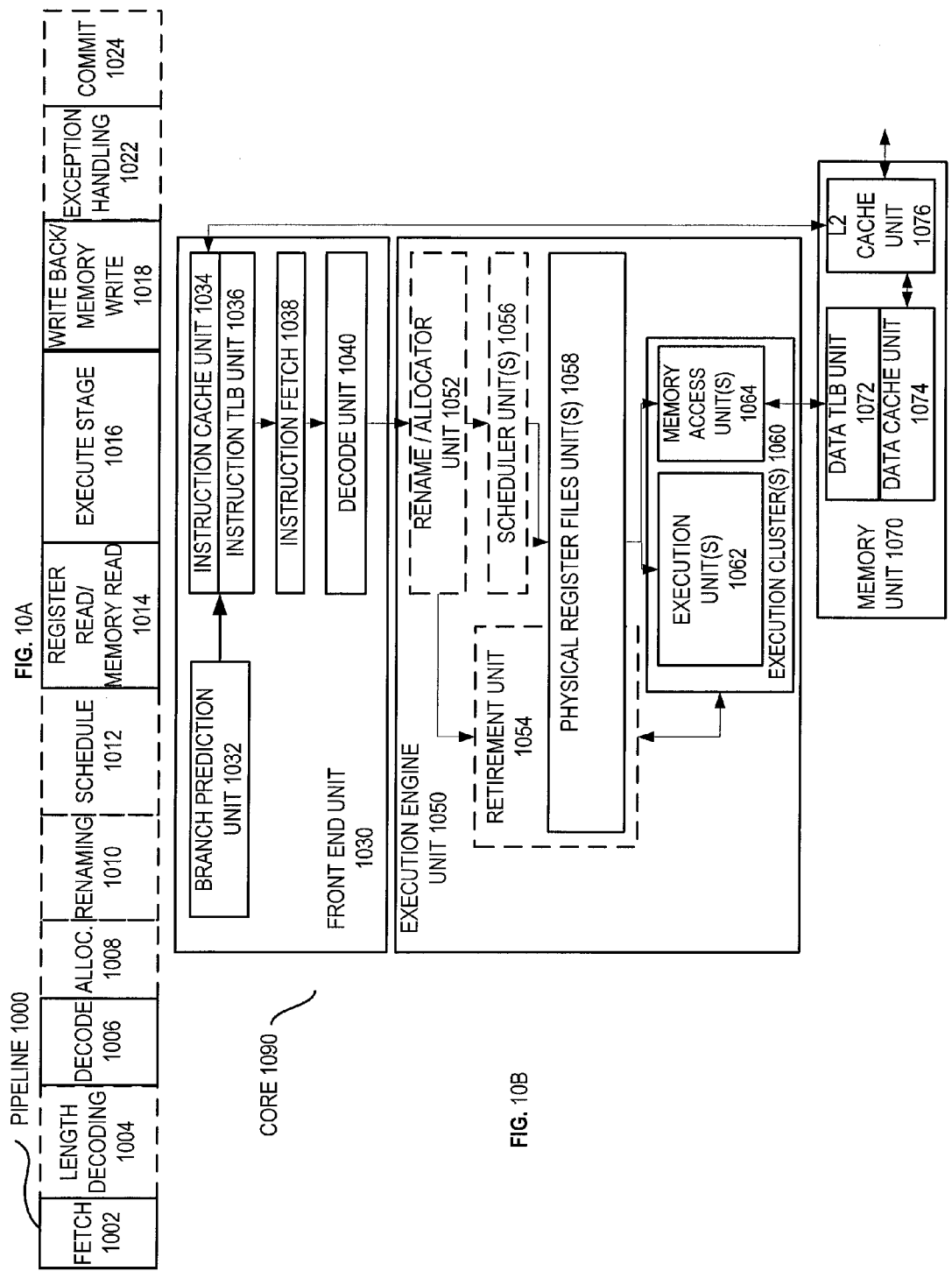

SYSTEMS, APPARATUSES, AND METHODS FOR PERFORMING CONFLICT DETECTION AND BROADCASTING CONTENTS OF A REGISTER TO DATA ELEMENT POSITIONS OF ANOTHER REGISTER

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions).

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

BRIEF DESCRIPTION OF THE DRAWINGS

The present invention is illustrated by way of example and not limitation in the figures of the accompanying drawings, in which like references indicate similar elements and in which:

FIG. 8 illustrates a correlation between the number of one active bit vector writemask elements and the vector size and the data element size according to one embodiment of the invention.

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
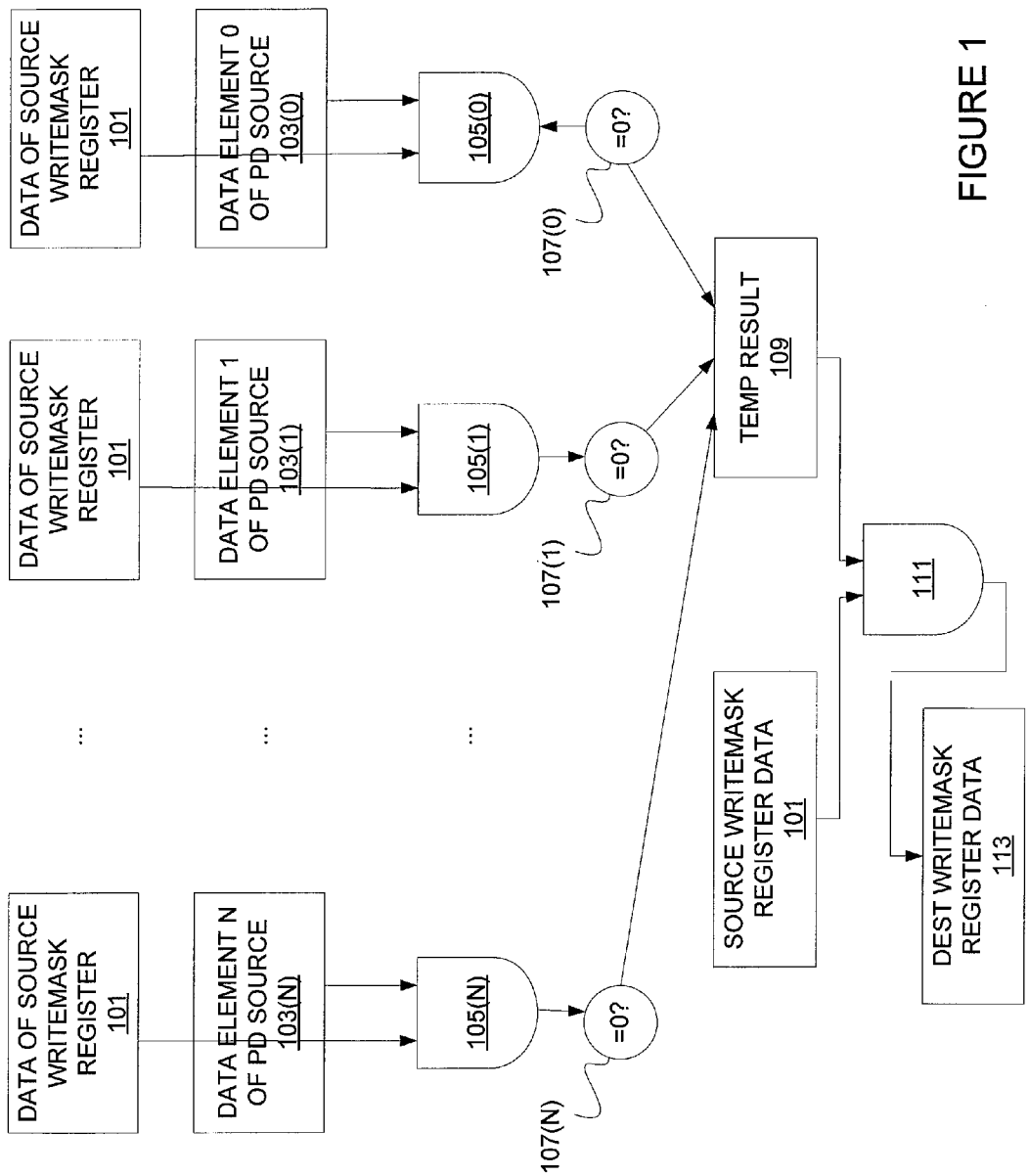
FIG. 1 illustrates an exemplary illustration of an operation of VPTESTCONF.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register (in this discussion vector registers and packed data element registers are used interchangeably), then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Additionally, there is a correlation between the number of one active bit vector writemask elements and the vector size and the data element size according to one embodiment of the invention as shown in FIG. 8. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

As noted above, writemask registers contain mask bits that correspond to elements in a vector register (or memory location) and track the elements upon which operations should be performed. For this reason, it is desirable to have common operations which replicate similar behavior on these mask bits as for the vector registers and in general allow one to adjust these mask bits within the writemask registers.

An important algorithmic pattern that we'd like to efficiently vectorize is "sparse updates." Here, we perform a read-modify-write operation on an indirectly addressed memory location (e.g., load A[B[i]], add something to it, and store the value back in A[B[i]]). Vectorizing this involves doing a gather-modify-scatter operation, which our ISA and hardware directly support—for 16 consecutive values of i, gather 16 A[B[i]], do a SIMD computation, and scatter the new values back. However, this vectorization assumes that a single gather/scatter instruction will access each memory location no more than once. If, for example, two consecutive values of B[i] are the same, then the read-modify-write for the second one is dependent on the first—doing these simultaneously in a SIMD fashion violates the dependence and may result in an incorrect answer.

Figure 18:
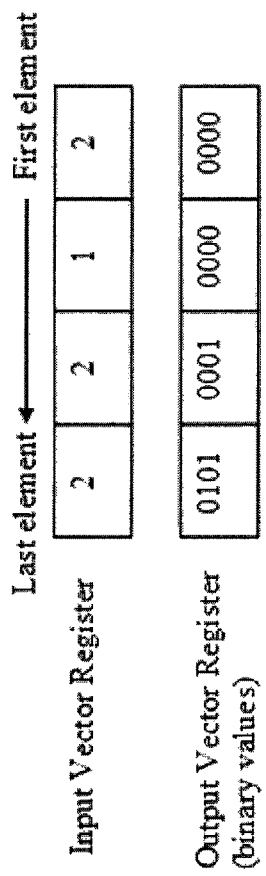
FIG. 18 illustrates output results of comparisons as a set of bit vectors.

It is possible to do a comparison for equality each element in a vector register with the "earlier" (closer to the LSB) elements. The instruction outputs the results of these comparisons as a set of bit vectors. This is illustrated in FIG. 18. Given that there will be duplicate information, the code can be vectorized and still enforce dependencies through memory by determining a subset of elements with unique indices, computing those in SIMD fashion, and then looping back to retry on the remaining elements. In pseudo-code this is:

```
for (i=0; i<N; i+=SIMD_WIDTH) {
   indices = vload(&B[i]);
   comparisons = vpconflict(indices);
   elements_left_mask = all_ones;
   do {
      do_these =
      Compute_Mask_of_Unique_Remaining_Indices(comparisons,
      elements_left_mask);
      Gather_Compute_Scatter(indices, do_these);
      elements_left_mask ^= do_these;
   } while (elements_left_mask != 0);
}
```

The function Compute_Mask_of_Unique_Remaining_Indices is one focus of this disclosure. This operation should to do the following:

(1) Zero-extend the elements_left_mask to be the same size as an index, and then logically AND the result with each element of "comparisons." This discards conflicts on any elements that have already computed in previous do-while loop iterations. To do this currently, we need to move the mask to a general-purpose register, and then broadcast it to a vector register.

(2) Test each element of the result of (1) for equality to zero. If an element is zero, then it has no conflicts, and we set a bit in the output mask register corresponding to this element.

(3) Logically AND the result of (2) with the elements_left_mask. This discards any elements that have already processed. This may take up to 5 instructions.

Detailed below is a single instruction (vptestconf k1, k2, zmm1) that performs all of the above functionality. This instruction replaces the entire Compute_Mask_of_Unique_Remaining_Indices function in the pseudo-code we showed at the beginning of the disclosure. That changes the pseudo-code to:

```
for (i=0; i<N; i+=SIMD_WIDTH) {
   indices = vload(&B[i]);
   comparisons = vpconflict(indices);
   elements_left_mask = all_ones;
   do {
      do_these = vptestconf(elements_left_mask, comparisons);
      Gather_Compute_Scatter(indices, do_these);
      elements_left_mask ^= do_these;
   } while (elements_left_mask != 0);
}
```

This instruction may be used compute masks corresponding to successive vectors of iterations that can proceed in parallel (not conflicting with each other). In other words, the first group corresponds to a mask with all elements that have no conflict (read-to-write) with a previous iteration set to 1, these can proceed in parallel. For the second iteration only needs to take into account elements corresponding to the iterations that have not been covered by the first mask and so on.

Below are embodiments of an instruction generically called a vector packed test conflicts ("VPTESTCONF") instruction of the instruction set and embodiments of systems, architectures, instruction formats, etc. that may be used to execute such an instruction that is beneficial in several different. The execution of a VPTESTCONF causes a logical "AND" of data from a source mask operand with each data element of a source packed data operand, followed by a determination of which of the logical "AND" operations indicate a conflict to create a conflict check result, and another logical "AND" with the conflict check result with the data from the source mask operand. The result of the second "AND" is stored in a destination location such as a destination mask operand. In some embodiments, the mask operand is a writemask register as detailed above. In some embodiments, the source mask operand is zero extended to be the same size as each data element of the source packed data operand.

FIG. 1 illustrates an exemplary illustration of an operation of VPTESTCONF. In the illustrated example, data from a source writemask register 101 is logically "ANDed" using AND logic 105(0)-(N) with data elements of a packed data source 103(0)-(N). The source register 101 does not have to be a writemask register and could be any other storage entity such as a general purpose register or packed data register. However, for ease of understanding, source writemask register will be used herein in this document. While the illustration shows separate source writemask registers, in some embodiments, this data is stored in a temporary packed data register that is of the same size as packed data source 103. The writing to this register may be accomplished by a broadcast instruction which will be detailed later in this specification. In some embodiments, the data of the source writemask register is zero extended to so that the data is of the same size as each packed data element of the packed data source 103. This ANDing discards conflicts on any elements that have already been computed in the exemplary scenario detailed earlier.

The result of each ANDing operation is then subjected to logic 107(0)-107(N) which determines if the result of the AND is a zero or not. If the result is a zero, then there are no conflicts between that element and other data elements. The result of these determinations are stored in a temporary result register 109 in corresponding bit positions of the temporary result register 109. For example, when data element 0 of the packed data source 103 is ANDed with the data of the source writemask register 101 and then the conflict determination is made by logic 107(0), this is a conflict result for data element position 0. This conflict determination is therefore stored in bit position 0 of the temporary result register 109. In some embodiments, a "1" is set when there are no conflicts and in others a "0" is used.

The contents of the temporary result register 109 are logically ANDed using logic 111 with the data from the source writemask register 101 to discard any elements that have already been processed. The result of this ANDing is stored in a destination writemask register 113.

Exemplary Format of VPTESTCONF

An exemplary format of this instruction is "VPTEST-CONF K1, K2, R2" where the destination operand K1 is a writemask register, K2 is a source writemask register, and source operand R2 is a vector (packed data) register (such as 128-, 256-, 512-bit register, etc.) and VPTESTCONF is the instruction's opcode. As noted earlier, the instruction will also work with other registers, not just writemask registers.

Exemplary Methods of Execution of VPTESTCONF

Figure 2:
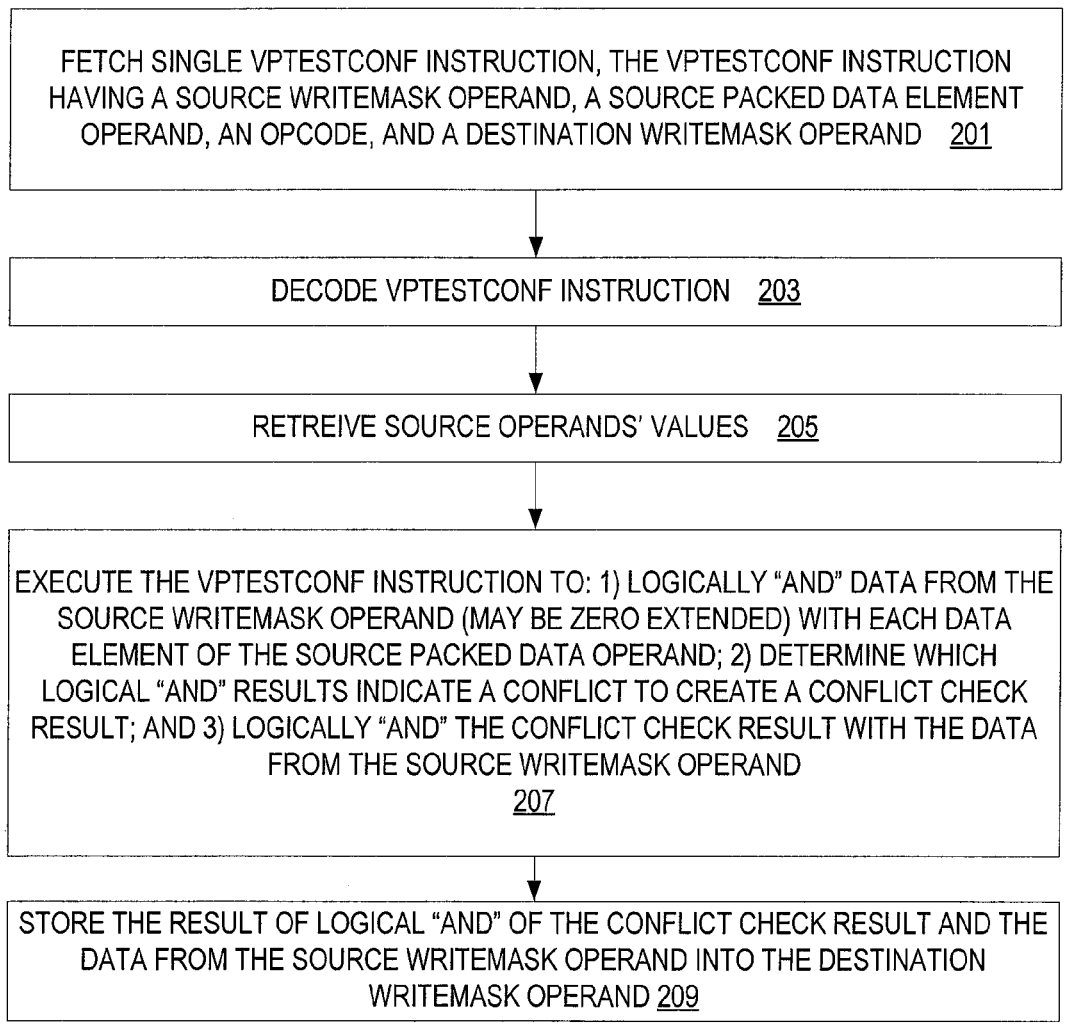
FIG. 2 illustrates an embodiment of the execution of a VPTESTCONF instruction in a processor.

FIG. 2 illustrates an embodiment of the execution of a VPTESTCONF instruction in a processor. A VPTESTCONF instruction with a source writemask register operand, a source vector register operand, an operand, and a destination writemask register is fetched at 201.

The VPTESTCONF instruction is decoded by decoding logic at 203. Depending on the instruction's format, a variety of data may be interpreted at this stage such as if there is to be a data transformation, which registers to write to and/or retrieve, what memory address to access, etc.

The source operand values are retrieved/read at 205. For example, the source vector register is read. If one or both of the source operands is a memory operand, then the data elements associated with that operand are retrieved. In some embodiments, data elements from memory are stored into a temporary register. At this stage, in some embodiments, if necessary, the source writemask data is zero extended so that it is the same size as a data element in the source vector register. In some embodiments, the (zero extended) source writemask data is broadcast to a temporary vector register that is the same size as the source vector register.

The VPTESTCONF instruction (or operations comprising such an instruction such as microoperations) is executed by execution resources such as one or more functional units at 207 to logically "AND" data from the source mask operand with each data element of the source packed data operand, followed by determining of which of the logical "AND" operations indicate a conflict to create a conflict check result, and logically "ANDing" the conflict check result with the data from the source mask operand.

The result of the second "AND" is stored in a destination location such as a destination mask operand at 209. While 207 and 209 have been illustrated separately, in some embodiments they are performed together as a part of the execution of the instruction.

Figure 3:
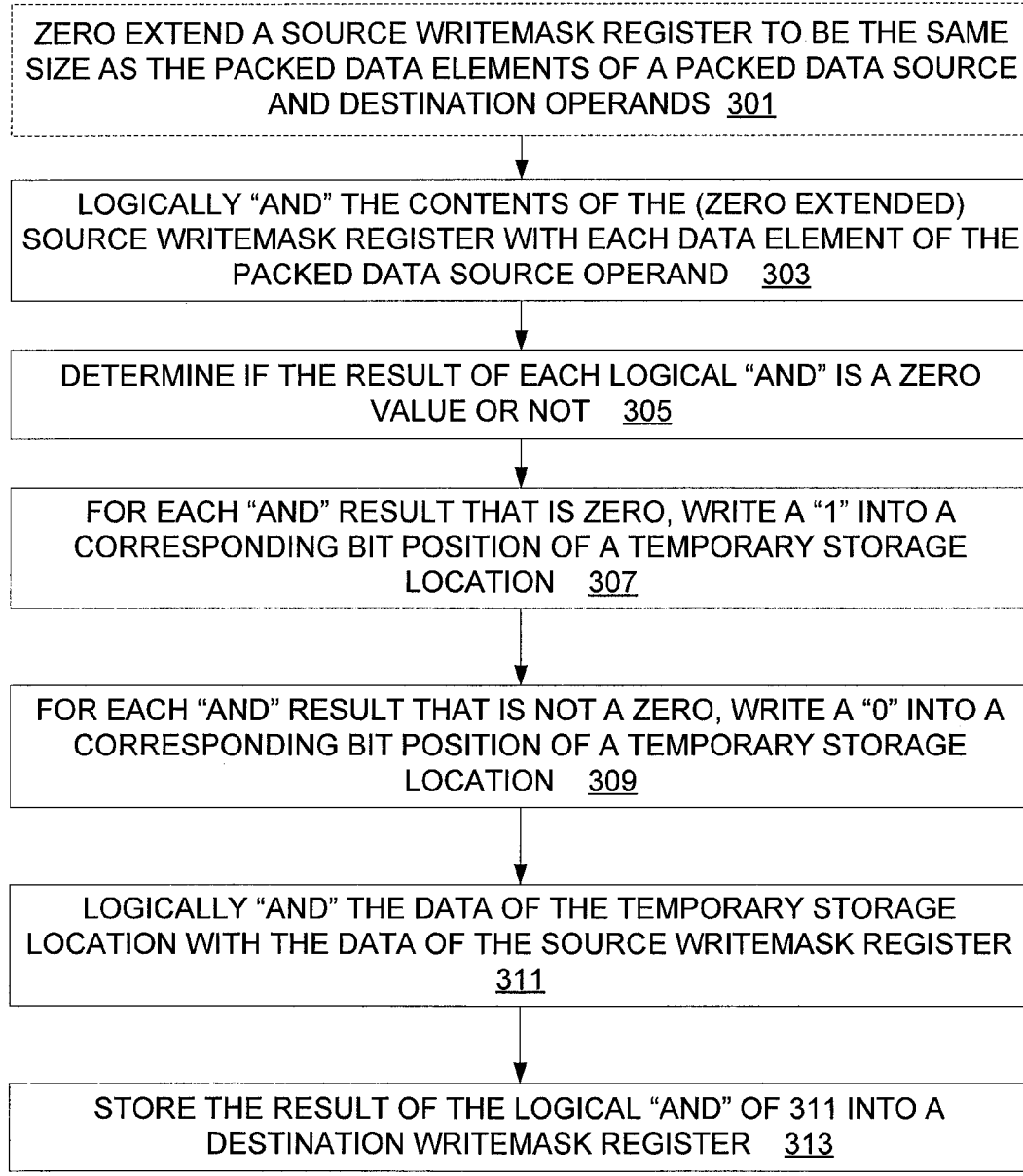
FIG. 3 illustrates an embodiment of a method for processing a VPTESTCONF instruction.

FIG. 3 illustrates an embodiment of a method for processing a VPTESTCONF instruction. In this embodiment it is assumed that some, if not all, of the operations 201-205 have been performed earlier, however, they are not shown in order to not obscure the details presented below. For example, the fetching and decoding are not shown, nor is the operand retrieval shown.

At 301, the data of the source writemask register is zero extended (if necessary) to the same size as the packed data elements of the packed data source and destination operands. For example, if the source writemask register is 8 bits and has a value of x01 and the data elements of the packed data source and destination are 16 bits, then the data of the source writemask register is extended 8 bits to be x0001. At this stage a broadcast may also be done.

Figure 4:
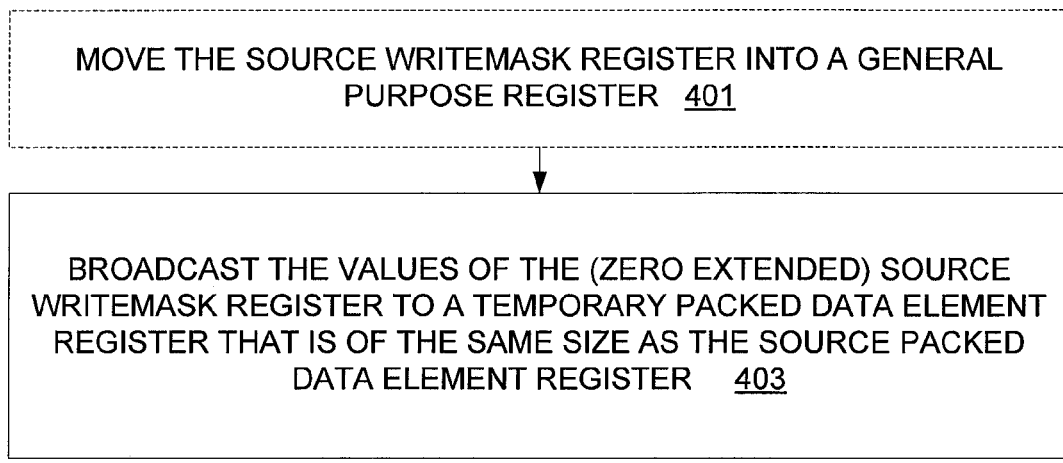
FIG. 4 illustrates an exemplary process for a broadcast.

FIG. 4 illustrates an exemplary process for this broadcast. In some embodiments, the (zero extended) data of the source writemask register is moved into a general purpose register at 401. The (zero extended) data of the source writemask register is broadcast to a temporary packed data element (vector) register that is of the same size as the source packed data element register at 403.

A logical AND of the contents of the (zero extended) source writemask register with each data element of the packed data source is performed at 303. If a broadcast was performed, a corresponding data element position by data element position ANDing of the temporary packed data element register to the source packed data element register is made at 303.

A determination of if the result of each AND operation is a zero value or not is made at 305. For each zero value resulting from the AND operation, a "1" is written into a corresponding bit position of a temporary storage location at 307. For each non-zero value resulting from the AND operation, a "0" is written into a corresponding bit position of a temporary storage location at 309.

The values of the temporary storage location are ANDing with the (zero extended) data of the source writemask register at 311 and the results of that ANDing are stored into a destination writemask register at 313.

Below are embodiments of an instruction generically called a vector packed test conflicts ("VPBROADCASTM") instruction of the instruction set and embodiments of systems, architectures, instruction formats, etc. that may be used to execute such an instruction that is beneficial in several different. The execution of a VPBROADCASTM causes a mask register of size M to be broadcast to a vector register with elements of size N (N>M). For example, VPBROADCASTMW2D broadcasts 16-bit masks to all of the doubleword packed data elements of a vector register destination. Many forms of this instruction may exist such as byte-to-byte (B2B), byte-to-word (B2W), word-to-word (W2W), word-to-quadword (W2Q), doubleword-to-doubleword (D2D), doubleword-to-quadword (D2W), and quad-word-to-quadword (Q2Q), etc.

Figure 5:
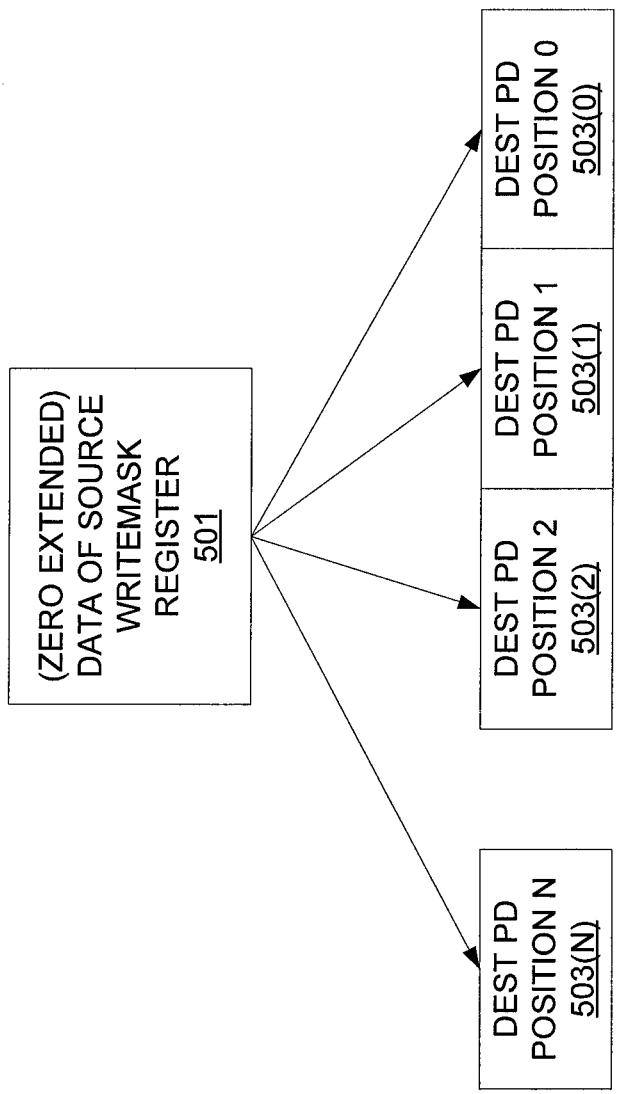
FIG. 5 illustrates an exemplary illustration of an operation of VPBROADCASTM.

FIG. 5 illustrates an exemplary illustration of an operation of VPBROADCASTM. In the illustrated example, data from a (zero extended) source writemask register 501 is broadcast to multiple data element positions of a packed data (vector) register destination 503.

Exemplary Format of VPBROADCASTM

An exemplary format of this instruction is "VPBROAD-CASTM {k2} R1, K1" where the source operand K1 is a writemask register, destination operand R2 is a vector (packed data) register (such as 128-, 256-, 512-bit register, etc.) and VPBROADCASTM is the instruction's opcode. As noted earlier, the instruction will also work with other registers, not just writemask registers. K2 is an optional writemask that may be used in the manner detailed above. In particular, each bit position of this writemask may be used to block the writing of a broadcast. For example, if the least significant bit position is a 0 then the least significant data element position of the destination register is does not have the (zero extended) data from the source writemask register written to it. The opcode may additionally have an indication of the type of data transfer B2B, B2W, etc. This may be used to determine the amount of zero extending that is to be done.

Exemplary Methods of Execution of VPBROADCASTM

Figure 6:
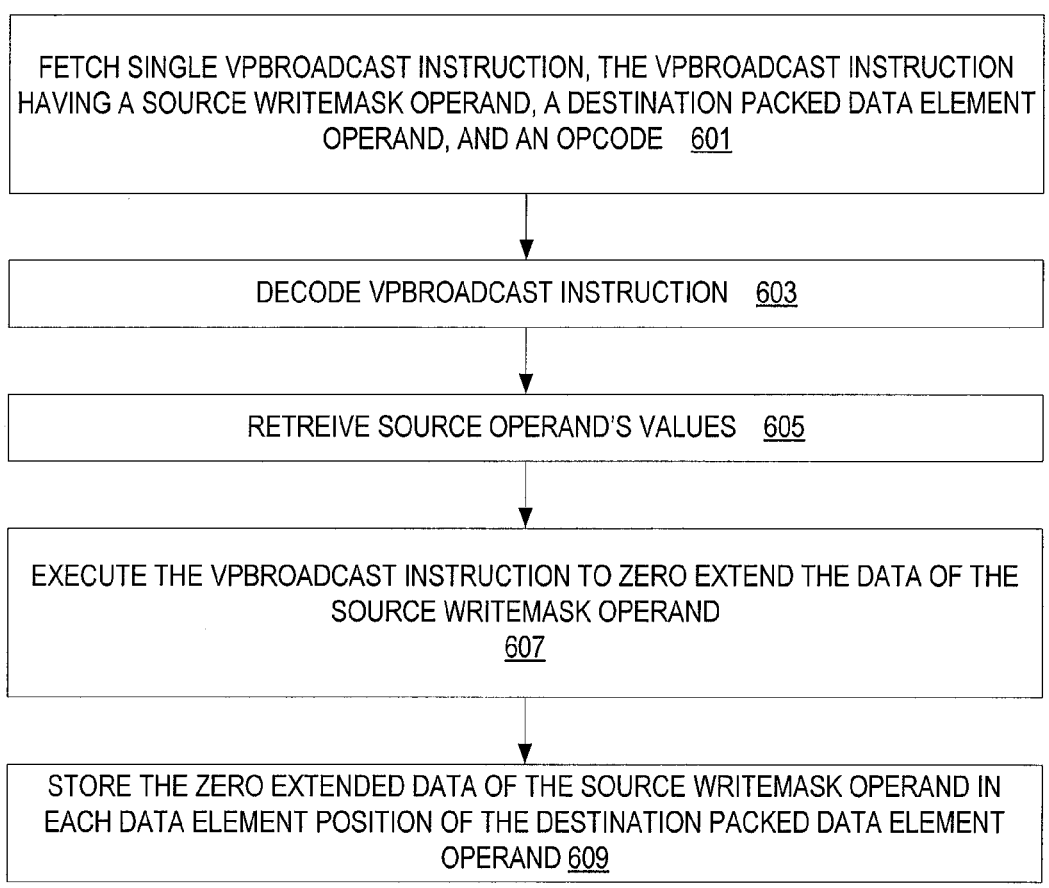
FIG. 6 illustrates an embodiment of the execution of a VPBROADCASTM instruction in a processor.

FIG. 6 illustrates an embodiment of the execution of a VPBROADCASTM instruction in a processor. A VPBROADCASTM instruction with a source writemask register operand and a destination vector register is fetched at 601.

The VPBROADCASTM instruction is decoded by decoding logic at 603. Depending on the instruction's format, a variety of data may be interpreted at this stage such as if there is to be a data transformation, which registers to write to and/or retrieve, what memory address to access, etc.

The source operand values are retrieved/read at 605. For example, the source writemask register is read.

The VPBROADCASTM instruction (or operations comprising such an instruction such as microoperations) is executed by execution resources such as one or more functional units at 607 to zero extend (if necessary) the data of the source writemask operand such that the data of the source writemask operand is the same size as a data element of the destination vector register.

The (zero extended) data of the source writemask register is broadcast (stored) into each data element position of the destination vector register at 609. While 607 and 609 have been illustrated separately, in some embodiments they are performed together as a part of the execution of the instruction.

Figure 7:
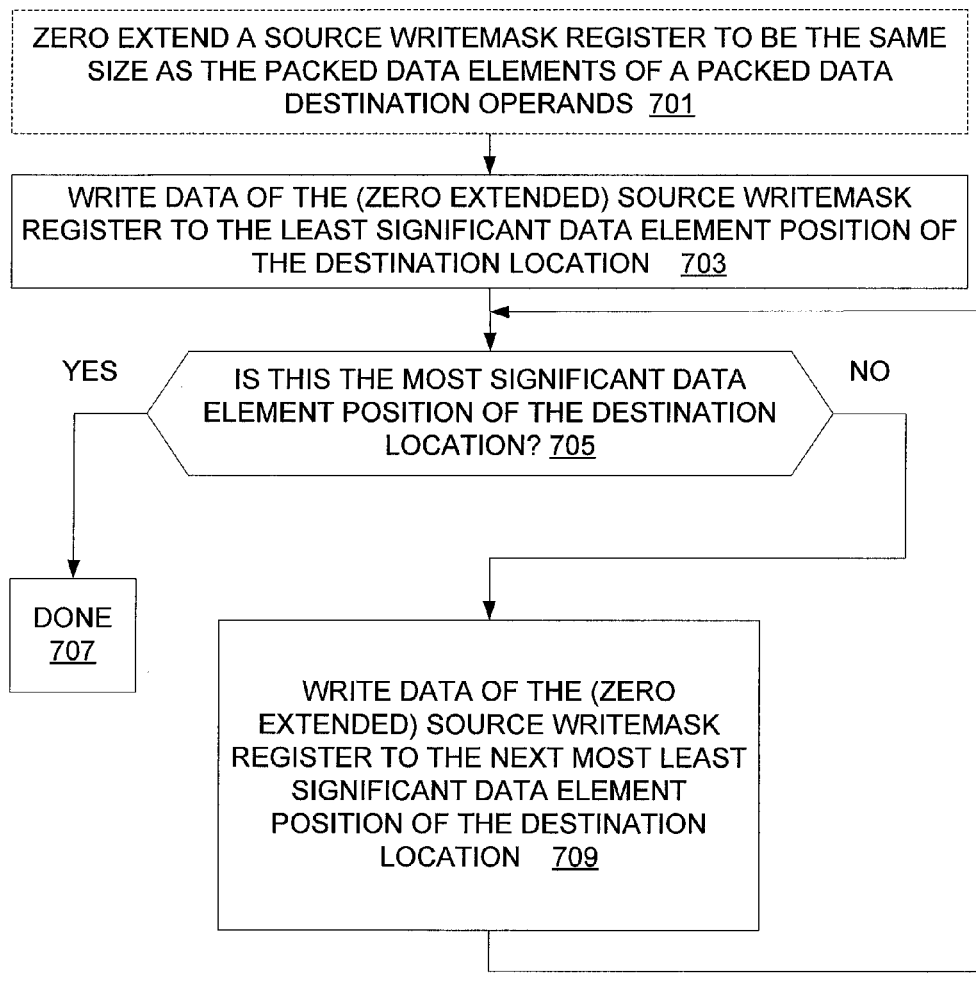
FIG. 7 illustrates an embodiment of a method for processing a VPBROADCASTM instruction.

FIG. 7 illustrates an embodiment of a method for processing a VPBROADCASTM instruction. In this embodiment it is assumed that some, if not all, of the operations 601-605 have been performed earlier, however, they are not shown in order to not obscure the details presented below. For example, the fetching and decoding are not shown, nor is the operand retrieval shown.

At 701, the data of the source writemask register is zero extended (if necessary) to the same size as the packed data elements of the packed data destination. For example, if the source writemask register is 8 bits and has a value of x01 and the data elements of the packed data destination are 16 bits, then the data of the source writemask register is extended 8 bits to be x0001.

The (zero extended) data of the source writemask is written to the least significant data element position of the destination register at 703

A determination of if this is the most significant data element position of the destination location is made at 705. If yes, then the broadcast is finished at 707. In some embodiments, this step is skipped after the writing to the least significant data element position.

If no, then the (zero extended) data of the writemask is written to the next most least significant data element position of the destination register at 709. A determination of if this is the most significant data element position of the destination location is made at 705.

While the above description for FIG. 7 is shown as a serial process, in some embodiments the data element positions of the destination register are written to in parallel. Additionally, as noted above, a writemask register may also be used in some embodiments to prohibit writing to data element positions.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Exemplary Register Architecture

Figure 9:
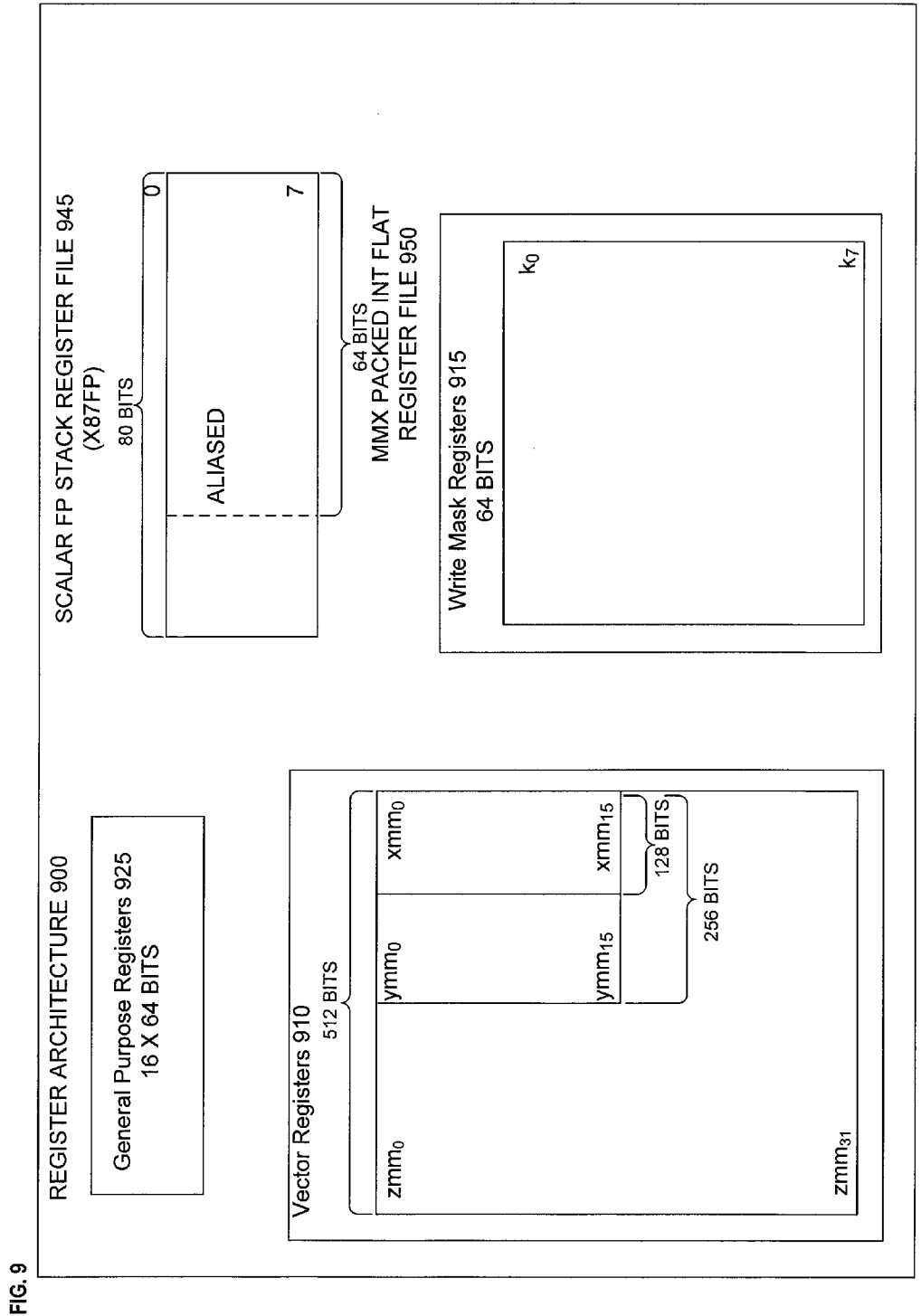
FIG. 9 is a block diagram of a register architecture 900 according to one embodiment of the invention.

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1058 comprises a vector registers unit and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 1064. It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
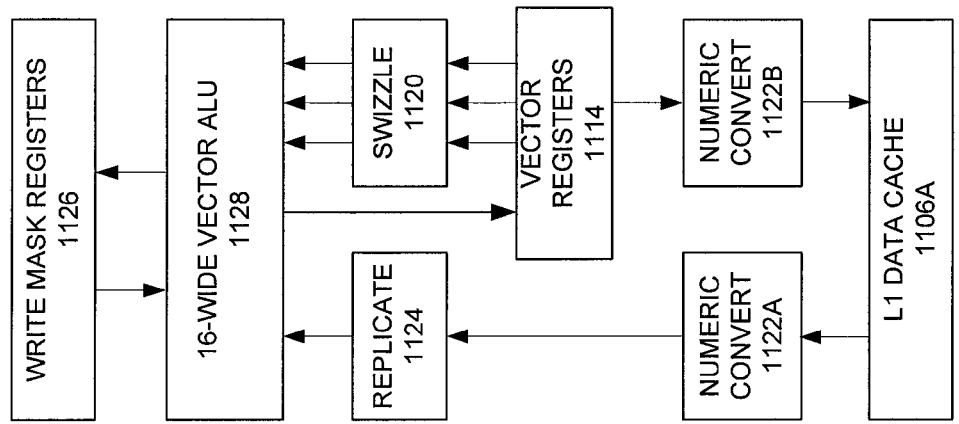
FIGS. 11A-B illustrate a block diagram of a more specific exemplary in-order core architecture, which core would be one of several logic blocks (including other cores of the same type and/or different types) in a chip.
Figure 11A:
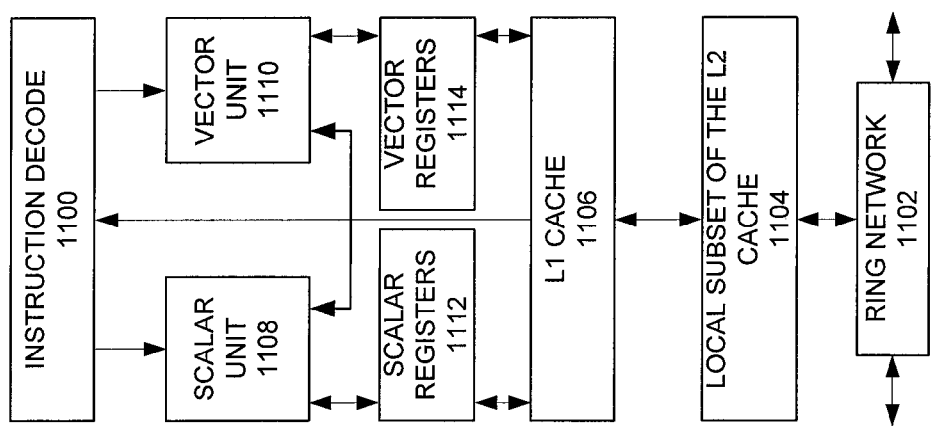

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input.

Processor with Integrated Memory Controller and Graphics

Figure 12:
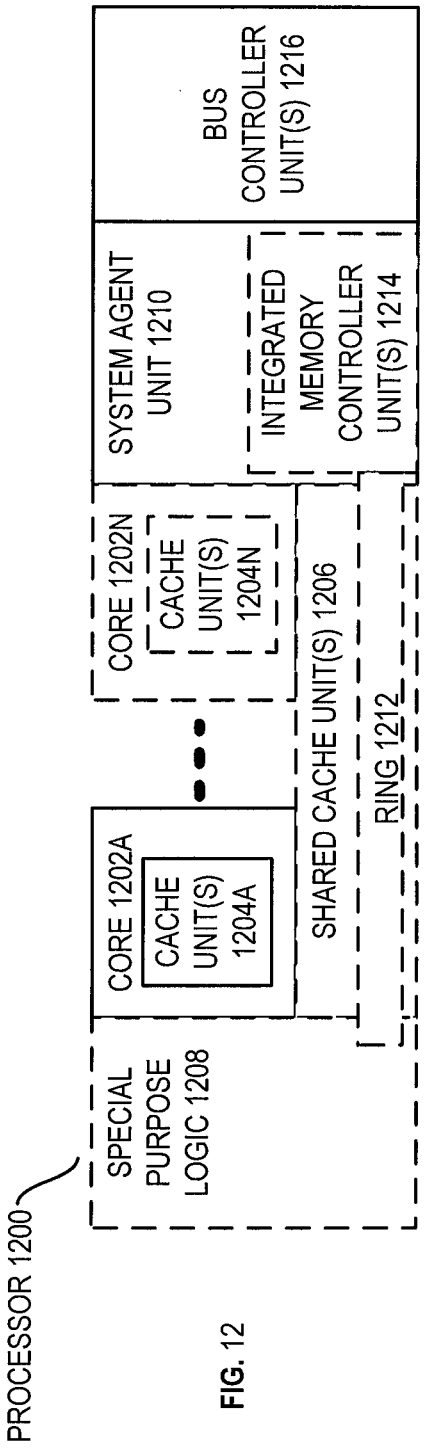
FIG. 12 is a block diagram of a processor 1200 that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
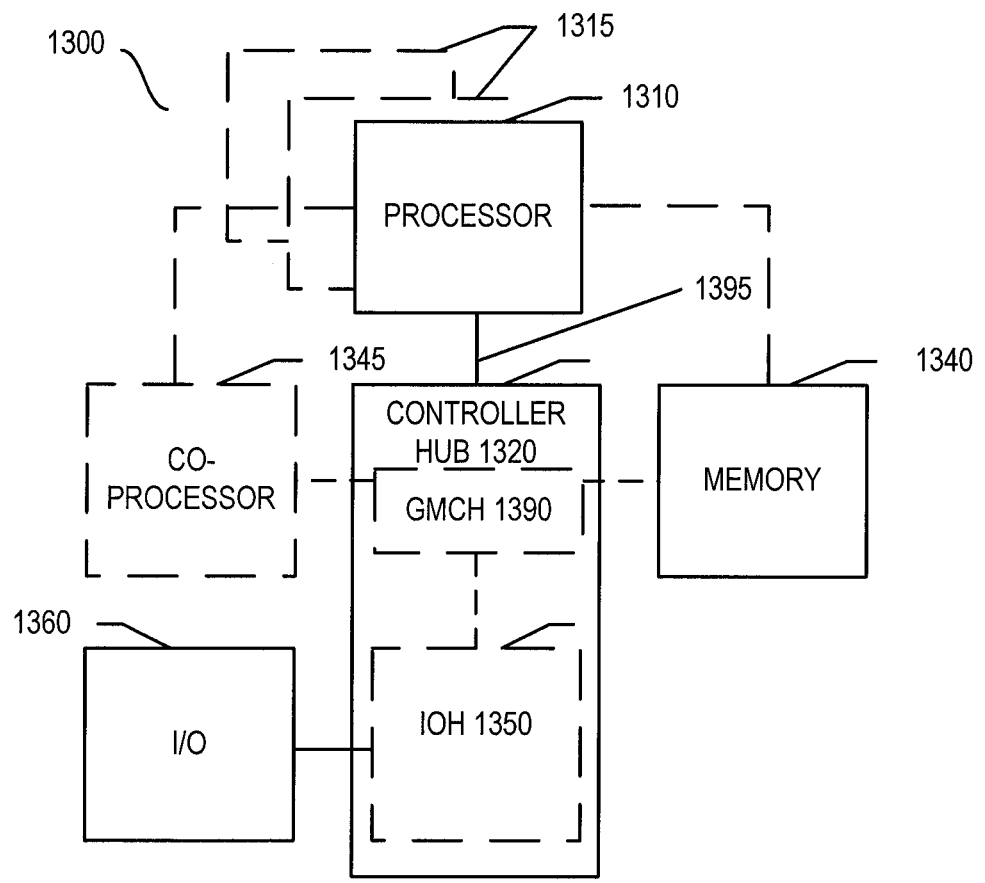
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
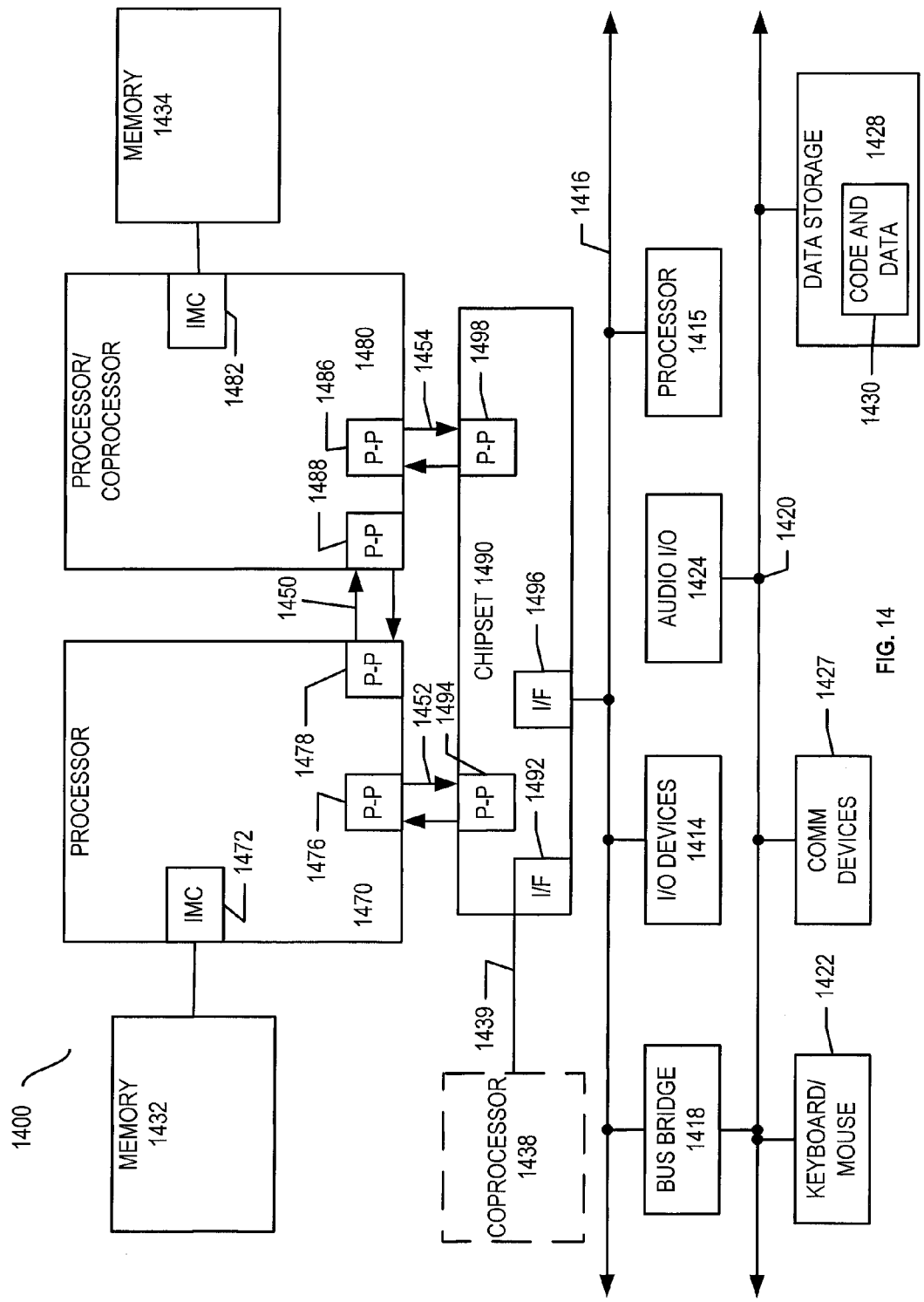

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
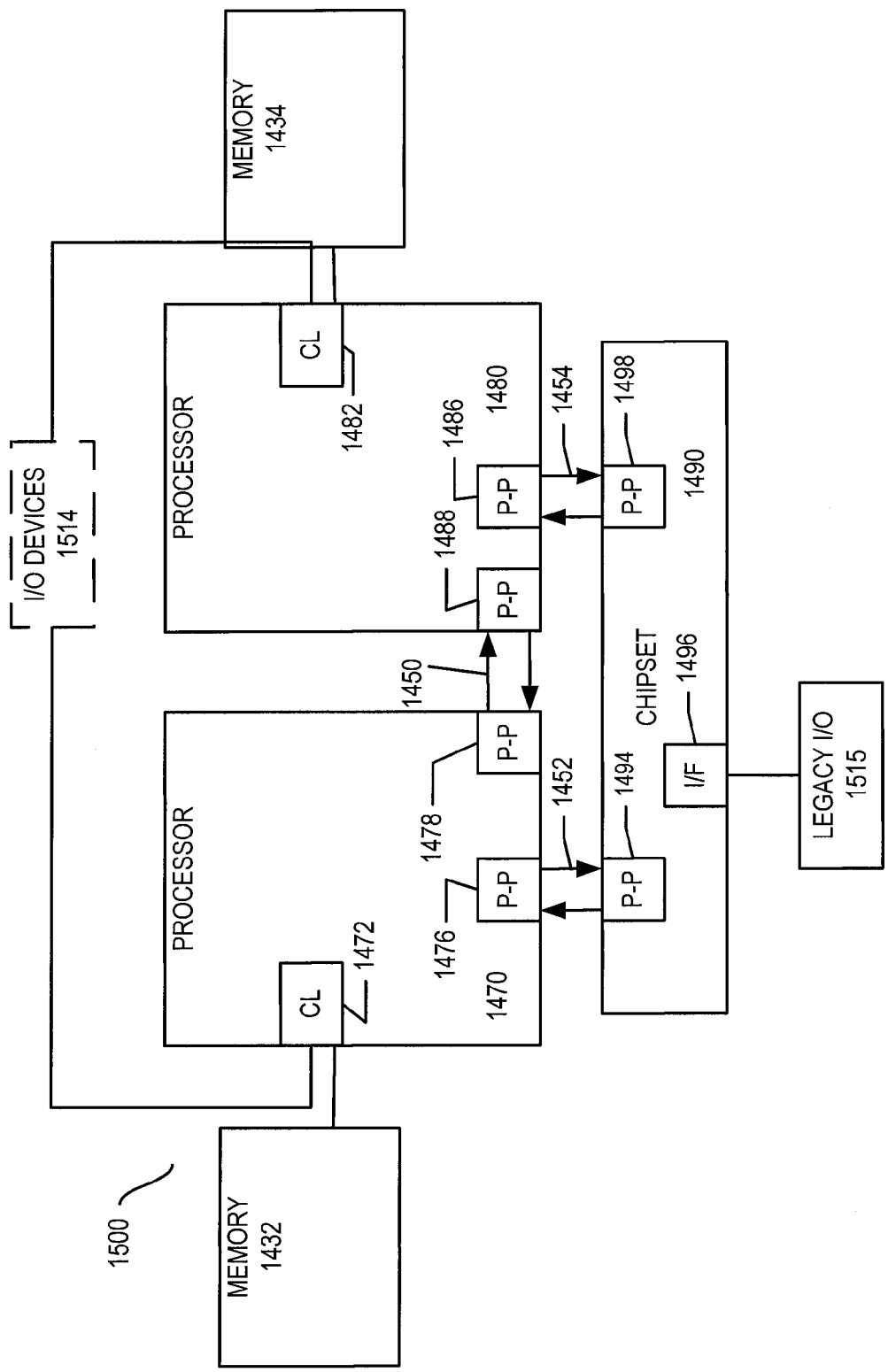

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
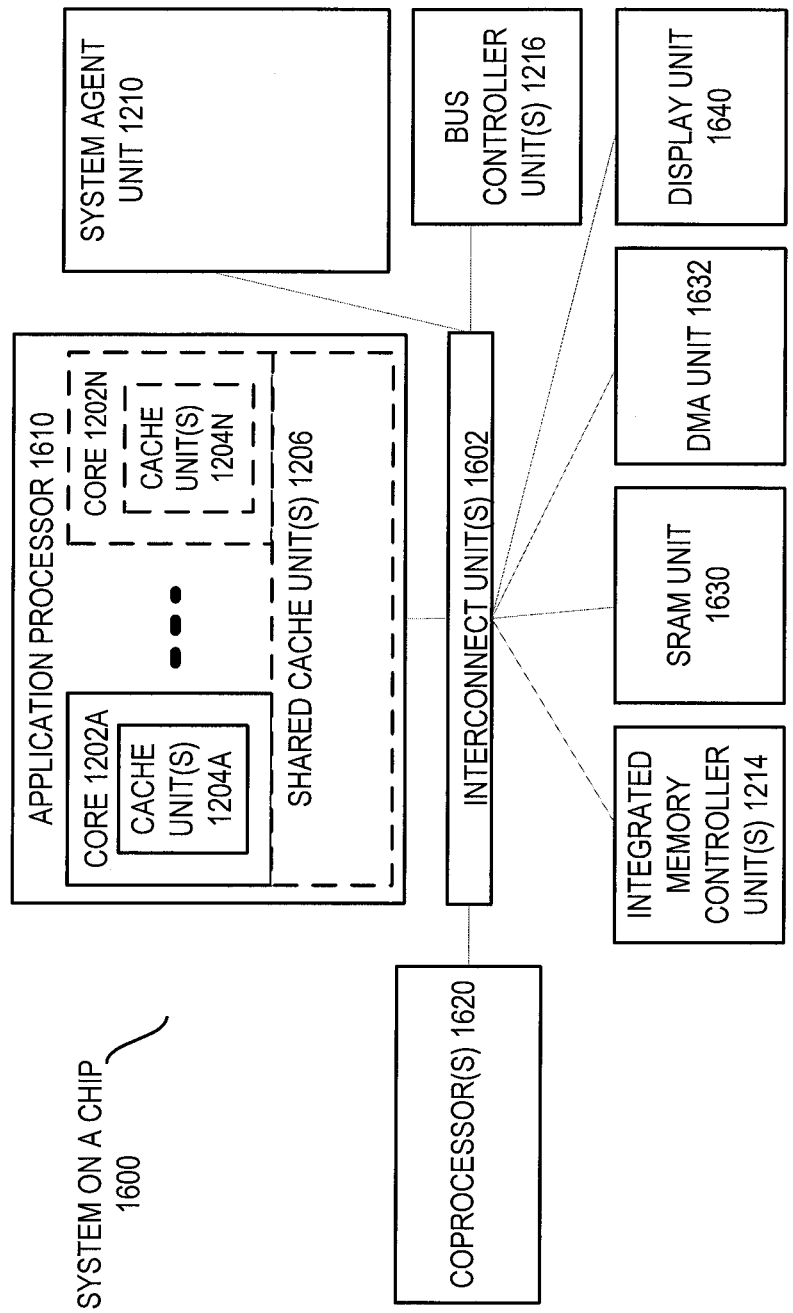

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphine, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
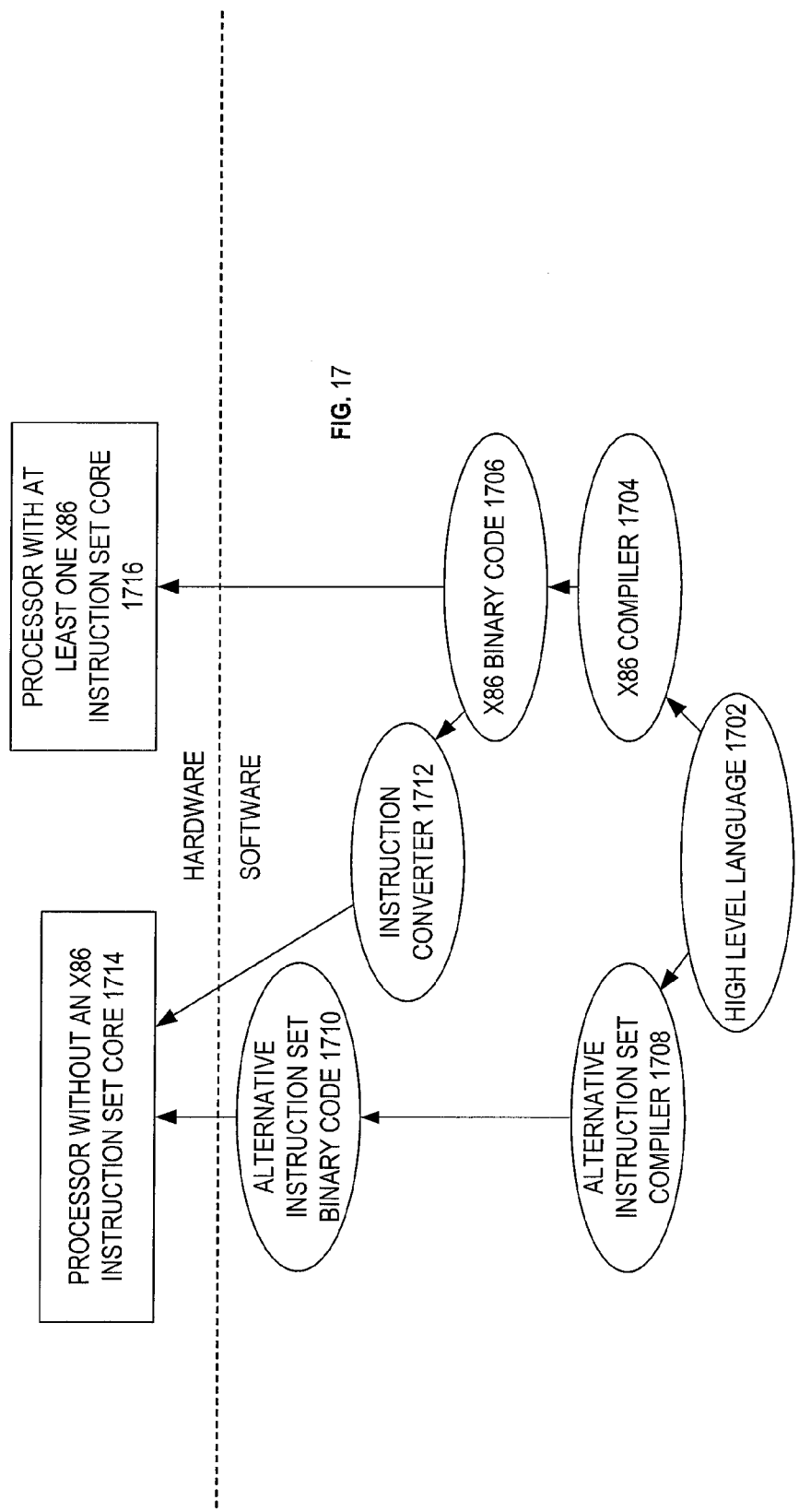
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

What is claimed is:

1. A method of comprising:
   executing a single instruction that includes a source writemask register operand, a source vector register operand, a destination writemask register operand, and an opcode to:
   logically AND data from the source writemask register operand with each data element of the source vector register operand,
   determine of which of the logical AND operations indicate a conflict to create a conflict check result, and
   logically AND the conflict check result with the data from the source writemask operand; and
   storing the result of the logical ANDing of the conflict check result with the data from the source writemask operand into the destination writemask register operand.

2. The method of claim 1, further comprising:
   zero extending data of the source writemask register operand such that the zero extended data will be of the same size as each data element of the source vector register operand.

3. The method of claim 1, further comprising:
   broadcasting the zero extended data of the source writemask register operand to a temporary vector register that has a same number and size data elements as the source vector register operand.

4. The method of claim 1, wherein the source vector register operand is of size 128-bit, 256-bit, or 512-bit.

5. The method of claim 1, wherein the destination writemask register operand is 64 bits.

6. The method of claim 1, wherein the destination writemask register operand is 16 bits.

7. The method of claim 1, wherein data elements of the source vector register operand are of 8-bit, 16-bit, 32-bit, 64-bit, 128-bit, or 256-bit in size.

8. An apparatus comprising:
   decode circuitry to decode a single instruction that includes a source writemask register operand, a source vector register operand, a destination writemask register operand, and an opcode;
   execution circuitry to execute the decoded single vector packed conflict testing instruction to:
   logically AND data from the source writemask register operand with each data element of the source vector register operand,
   determine of which of the logical AND operations indicate a conflict to create a conflict check result, and
   logically AND the conflict check result with the data from the source writemask operand,
   store the result of the logical ANDing of the conflict check result with the data from the source writemask operand into the destination writemask register operand.

9. The apparatus of claim 8, wherein the execution circuitry to further:
   zero extend data of the source writemask register operand such that the zero extended data will be of the same size as each data element of the source vector register operand.

10. The apparatus of claim 8, wherein the execution circuitry to further:

broadcast the zero extended data of the source writemask register operand to a temporary vector register that has a same number and size data elements as the source vector register operand.

11. The apparatus of claim 8, wherein the source vector register operand is of size 128-bit, 256-bit, or 512-bit.

12. The apparatus of claim 8, wherein the destination writemask register operand is 64 bits.

13. The apparatus of claim 8, wherein the destination writemask register operand is 16 bits.

14. The apparatus of claim 8, wherein data elements of the source vector register operand are of 8-bit, 16-bit, 32-bit, 64-bit, 128-bit, or 256-bit in size.

15. A non-transitory machine-readable medium storing an instruction which when executed by a hardware processor to cause the hardware processor to perform a method, the method comprising:
  executing a single instruction that includes a source writemask register operand, a source vector register operand, a destination writemask register operand, and an opcode to:
    logically AND data from the source writemask register operand with each data element of the source vector register operand,
    determine of which of the logical AND operations indicate a conflict to create a conflict check result, and
    logically AND the conflict check result with the data from the source writemask operand; and
    storing the result of the logical ANDing of the conflict check result with the data from the source writemask operand into the destination writemask register operand.

16. The non-transitory machine-readable medium of claim 15, wherein the method further comprises:
  zero extending data of the source writemask register operand such that the zero extended data will be of the same size as each data element of the source vector register operand.

17. The non-transitory machine-readable medium of claim 15, wherein the method further comprises:
  broadcasting the zero extended data of the source writemask register operand to a temporary vector register that has a same number and size data elements as the source vector register operand.

18. The non-transitory machine-readable medium of claim 15, wherein the source vector register operand is of size 128-bit, 256-bit, or 512-bit.

19. The non-transitory machine-readable medium of claim 15, wherein the destination writemask register operand is 64 bits.

20. The non-transitory machine-readable medium of claim 15, wherein the destination writemask register operand is 16 bits.

21. The non-transitory machine-readable medium of claim 15, wherein data elements of the source vector register operand are of 8-bit, 16-bit, 32-bit, 64-bit, 128-bit, or 256-bit in size.

* * * * *